United States Patent [19]
Horowitz

[11] 3,740,106
[45] June 19, 1973

[54] BRAKE SYSTEM CONTROL VALVE
[75] Inventor: Charles Horowitz, Niles, Ill.
[73] Assignee: The Berg Manufacturing Company, Des Plaines, Ill.
[22] Filed: Apr. 26, 1971
[21] Appl. No.: 137,518

[52] U.S. Cl. ......... 303/71, 137/627.5, 137/630.19, 303/68
[51] Int. Cl. ............................................. B60t 13/22
[58] Field of Search ...................... 303/8, 9, 68, 71, 303/75, 76, 79, 80, 81, 50; 137/627.5, 628, 630.19

[56] References Cited
UNITED STATES PATENTS
3,478,782  11/1969  Peeples............................ 303/68 X
3,224,815  12/1965  Horowitz............................. 303/71
3,449,019   6/1969  Walker............................ 303/68 X
3,087,760   4/1963  Valentine et al. ................. 303/71 X
3,115,371  12/1963  Valentine......................... 303/71 X Primary Examiner—George E. A. Halvosa
Attorney—Parker, Plyer & McEachran

[57] ABSTRACT

A brake system control valve in which elements are movable in one direction to supply fluid pressure from a first source, in the opposite direction to exhaust the valve and an overtravel element provides for further movement in the original direction to supply fluid pressure from a second source.

9 Claims, 1 Drawing Figure

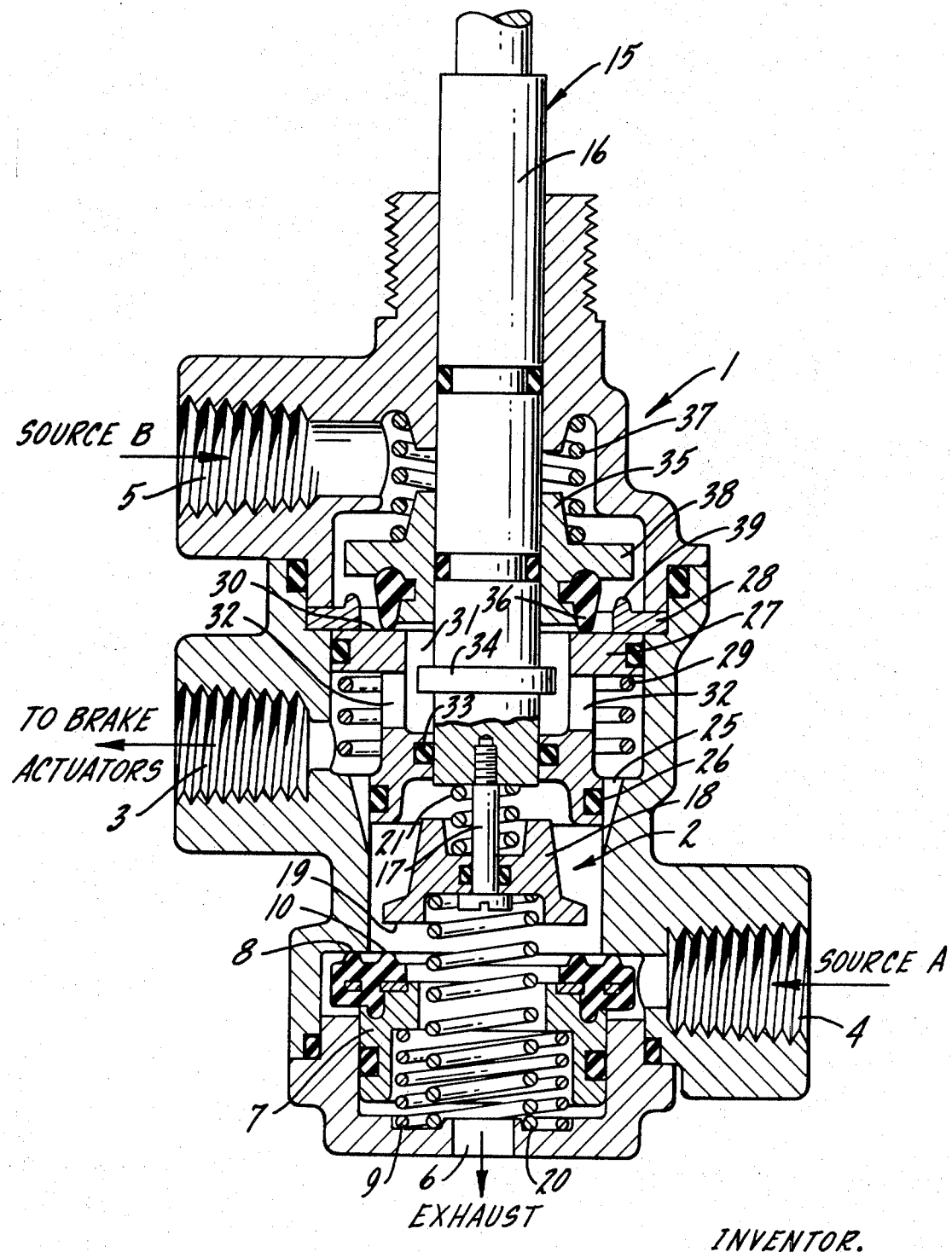

3,740,106

BRAKE SYSTEM CONTROL VALVE

SUMMARY OF THE INVENTION

This invention relates to fluid pressure vehicle brake systems and particularly to a control valve for such systems.

Brake systems of tractor-trailer combination vehicles employ spring-applied, fluid pressure-released emergency and parking brake actuators on the tractor and on the trailer. The vehicle brakes are applied through such actuators by releasing the fluid pressure therefrom to atmosphere. The systems provide for such application in the event of an emergency loss of fluid pressure and for the intentional exhaust of such pressure by the vehicle operator in the event of an emergency or for parking the vehicle. Such actuators are released by resupplying fluid pressure thereto as required, for example, to move a stalled vehicle from a busy expressway. As a safety feature, the systems of such vehicles employ alternate, independent sources of fluid pressure. The means supplied for operator application and release of such actuators comprises a hand control valve readily available to the operator and normally installed on the dash of the tractor cab. Safety considerations indicate the desirability of clearly distinguishable operator movements required to apply and release the brake actuators and the need for such movements to follow a natural sequence. Hence it is one purpose of the present invention to provide a hand control valve assembly including a valve-operating element movable in one direction to release such brake actuators through the mediacy of a first or normal fluid pressure source; in the opposite direction to apply such brake actuators and movable further in said one direction to release such brake actuators through the mediacy of an alternate fluid pressure source, said one direction being forward in the direction of normal movement of the vehicle, said opposite direction being rearward, the movement of the operating element corresponding thus to the braking and brake releasing affects upon the vehicle.

Another purpose is to provide a hand control valve of maximum simplicity in construction and manufacture, while operable to achieve the foregoing purpose.

Another purpose is to provide a control valve incorporating, in a single housing, valve and operating means effective to supply fluid pressure through said valve from a first source, to supply fluid pressure through said valve from a second source or to exhaust either of said supplied pressures through said valve.

Another purpose is to provide a control valve for fluid pressure brake systems including an operating means movable in response to a first force level to supply fluid pressure through said valve from a first source and movable in the same direction at a greater force level to supply fluid pressure through said valve from a second source.

Another purpose is to provide a brake control valve having elements movable into a position transmitting pressure from a first source and held in said position by said pressure and movable into a second position transmitting pressure from a second source and not held in said second position by said last-named pressure.

Other purposes may appear from time to time during the course of the specification and claims.

BRIEF DESCRIPTION OF THE DISCLOSURE

The invention is illustrated more or less diagrammatically in the accompanying drawing wherein:

The FIGURE is a side view in partial cross section.

Like parts are indicated by like numerals throughout the specification and drawing.

DESCRIPTION OF THE PREFERRED EMBODIMENT

Referring now to the drawing, the numeral 1 generally designates a housing. A valve chamber, generally designated at 2, is defined within said housing and a fluid pressure outlet port 3 communicates with said chamber intermediate its ends. A pair of fluid pressure inlet ports 4,5 are positioned on opposite sides of outlet 3 for communication with and adjacent the opposite ends of chamber 2. An exhaust outlet 6 is provided for exhaust of chamber 2 to atmosphere.

A hollow, dual valve-faced piston 7 is reciprocal in the end of chamber 2 adjacent exhaust outlet 6. Member 7 carries an outer annular valve face 8 yieldingly urged by spring 9 into a position closing inlet 4 against communication with chamber 2. Member 7 also carries an inner annular valve face 10 positioned to control communication of chamber 2 with outlet 6.

A valve-operating means, generally indicated at 15, includes a shaft 16 slidable in housing 1 and extending into and substantially through chamber 2. At its inner end the shaft 16 carries, slidably on fastener 17, a valve operating head 18 having an annular seat 19 positioned for contact with the valve face 10 to close communication between chamber 2 and outlet 6. A yielding means 20 engages head 18 and the opposed inner end surface of housing 1 to urge head 18 and shaft 16 in a direction outwardly of the housing 1, away from member 7 and into the position shown. It will be observed that a yielding means represented by the spring 21 surrounds fastener 17 and has its opposite ends engaging the head 18 and the opposed end surface of shaft 16 to create an overtravel structure portion of valve operating means 15. It will be understood that spring 21 is of a force or strength level greater than that of springs 9,20, as will be discussed in greater detail hereinbelow.

Communication of inlet 4 through chamber 2 with outlet 3 is provided through a series of circumferentially spaced grooves 25, the lands between the grooves 25 being engaged slidably by the seal 26 of a shuttle piston member 27 reciprocal in chamber 2 and surrounding an inner end portion of shaft 16. Member 27 is yieldingly urged into engagement with flange or shoulder ring 28 of housing 1 by spring 29. An annular external valve seat surface 30 surrounds the mouth of a well 31 in member 27, the well 31 communicating at all positions through passages 32 with the outlet 3. It will be observed that shaft 16 is slidably, sealingly associated with the member 27, as indicated at 33, and that the well 31 is of substantially greater diameter than the shaft 16. Abutment collar or shoulder 34 is fixed on or integral with shaft 16 within well 31 for contact with the bottom wall of well 31 when shaft 16 is moved a sufficient distance inwardly of housing 1.

Slidable on shaft 16 and in sealing engagement therewith is a valve member 35 having an annular valve face 36 yieldingly urged toward engagement with the seat 30 by spring 37. Valve member 35 includes an annular flange 38, intermediate its ends and positioned for contact with circumferentially spaced stop abutments 39 upstanding from flange ring 28, the flange 38 having a diameter greater than that of valve face 36 and less than that of the chamber 2 thereabout, the inlet 5 communicating with the portion of chamber 2 surrounding valve member 35.

The use and operation of the invention are as follows:

In a vehicle brake system incorporating a parking-emergency brake segment having spring-applied, fluid pressure released brake actuators, inlet 4 would be communicated with a first or normal tank or reservoir of fluid pressure (not shown) and inlet 5 would be connected to a second, independent tank or reservoir, often called the "protected" tank, of fluid pressure, the latter being normally static and unused. For convenience the normally used source of fluid pressure is designated as source A in the drawing and the auxiliary or protected source of fluid pressure is indicated as source B in the drawing. In such installations the outlet 3 is provided for communication with the described brake actuators for supply of brake-releasing fluid pressure thereto.

To apply the parking-emergency brakes of such a vehicle, the vehicle operator draws the shaft 16 rearwardly or toward himself into the position shown in the drawing. It will be understood that a suitable handle (not shown) is provided for connection to the external portion of shaft 16. With the shaft thus withdrawn, as shown in the drawing, the head member 18 is separated from valve face 10 and a channel is opened communicating outlet 3, and thus the brake actuators, through passage 25, chamber 2 and the axial bore in member 7 for exhaust to atmosphere through exhaust outlet 6. With the brake actuators thus exhausted, the actuator springs therein are enabled to apply the brakes. When the operator desires to release the brakes, in normal operation employing the source A, the shaft 16 is moved forwardly or away from the operator and into the housing 1 to bring the member 18 into contact with seat 10 and thus to close the exhaust outlet against communication with chamber 2. Continued inward movement of shaft 16 causes the member 7 to move against the action of spring 9 and thus to unseat valve face 8, enabling communication of inlet 4 through chamber 2 and passages 25 to outlet 3 for supply of brake-releasing fluid pressure to the brake actuators. It will be understood that spring 21 is of a force or strength level greater than that of springs 9 and 20 so that the normal closing of exhaust outlet 6 and unseating of valve face 8 is accomplished without compression of spring 21 and with the shaft 16 and member 18 remaining separated by spring 21 substantially as shown in the drawing. In such event, also, the shoulder 34 is moved within well 31 but does not contact the annular bottom wall of well 31 about the shaft 16. The pressure thus introduced and transmitted through the valve assembly from port 4 to port 3 is effective to hold members 7, 18 and 16 in said position, springs 9,20 being designed to permit such action at predetermined normal pressure levels.

Should fluid pressure source A be deleted or exhausted for any reason below a predetermined level, springs 9,20 will move the parts to the position shown, will exhaust the actuators and cause the brakes to be applied. The operator is nonetheless provided with a means of releasing the brakes thus applied by the brake actuator spring. The means provided enables the operator to release the brakes by movement of the shaft 16 in the same direction as that initially employed in releasing the brakes by the use of pressure source A. Thus the operator pushes the shaft 16 further inwardly, with somewhat greater force, to compress spring 21.

It will be understood that the initial inward or forward movement of shaft 16 operates as above described, i.e. member 18 is brought into contact with valve face 10 to close outlet 6. Member 7 is then moved downwardly to unseat valve face 8, the member 7 seating against opposed housing surfaces and the springs 9,20 being compressed. With no pressure available at source A, such operation would be ineffective to release the brakes of the vehicle.

In this instance, however, the operator, applying somewhat greater force, moves the shaft 16 further inwardly against the action of spring 21. Such further inward movement of shaft 16 brings shoulder 34 into contact with the bottom wall of well 31 to move member 27 in said direction and toward inlet 4, thus bringing the seal 26 into sealing engagement with the inner surface defining chamber 2 beyond the passage grooves 25 and thus closing chamber 2 and inlet 4 against passage of fluid therethrough. Member 35 will travel, under the influence of spring 37, with the shaft 16, through the early movement of member 27 and until the seal 26 engages the unbroken inner surface of chamber 2 to seal inlet 4. Thereafter the flange 38 of member 35 contacts the limit stop abutments 39 carried by housing 1 and member 35 can move no further in said direction. Thereafter the valve seat surface 30 of member 27 separates from value face 36 as member 27 is moved further in said direction.

Thereupon communication is open between inlet 5 from the protected source B of fluid pressure, enabling said fluid pressure to flow into chamber 2, about the flange 38 of member 35, past the now open valve face 36, into well 31 and through passages 32 for escape through outlet 3 and delivery to the brake actuators to release the brakes.

It will be observed that the channel thus provided for transmission of fluid pressure from port 5 to port 3 is isolated from elements 7, 18, 9 and 20 and that shaft 16 must thus be held manually in the forward position as long as the operator desired to maintain the brakes in released status through the mediacy of pressure from source B.

Subsequent or intermittent application of the spring brake actuators is accomplished in the same manner as was accomplished with the employment of source A, i.e. the shaft 16 is released for movement rearwardly under the influence of spring 9 and into the position shown in the drawing to exhaust the actuators through outlet 3, chamber 2 and exhaust outlet 6. The return of the shaft 16 to said position again closes off inlet 5 and the source B remains protected for subsequent use if desired.

Thus the vehicle operator is supplied with a single control member movable rearwardly to apply the vehicle brakes in each instance and movable forwardly to release the brakes in each instance, release of the brakes through the mediacy of source A being provided by a first forward excursion of shaft 16 at a first force level and release of the brakes through the mediacy of source B being accomplished by a forward excusion of shaft 16 for greater distance and at somewhat greater force level.

The embodiments of the invention in which an exclusive property or privilege is claimed are defined as follows:

1. In a fluid pressure brake system control valve, a housing, a chamber in said housing, a fluid pressure outlet communicating with said chamber, a first fluid pressure inlet communicating with said chamber on one side of said outlet, a second fluid pressure inlet communicating with said chamber on the other side of said outlet, an exhaust outlet communicating with said chamber, first valve means controlling communication between said first inlet and said pressure outlet, second valve means controlling communication between said second inlet and said pressure outlet, a valve operating member slidable in said housing and having a portion extending externally thereof for manual operation, said valve operating member including a head element carried within said housing and positioned for communicating said exhaust outlet with said pressure outlet when said operating member is moved in a direction outwardly of said housing, said head being positioned to close said exhaust outlet against said last-named communication when said operating member is moved inwardly of said housing, said head being movable against said first valve means in response to said inward movement of said operating member to open said first valve means and to open communication between said first inlet and said pressure outlet, yielding means urging said head and said operating member in opposite directions, abutment means positioned on said operating member for contact with said second valve means to open communication between said second pressure inlet and said pressure outlet when said operating means is moved further into said housing in compression of said yielding means.

2. A hand control valve for fluid pressure brake systems including a housing, a pair of fluid pressure inlets in said housing, a fluid pressure outlet in said housing, an exhaust outlet in said housing, valve elements in said housing controlling communication between said inlets and said outlets, a valve operating means movable in said housing and having a portion extending externally thereof, said operating means including a shaft, a valve seat head carried within said housing by said shaft for contact with at least one of said valve elements in response to movement of said shaft in one direction, initial movement of said shaft causing said valve seat head to contact said one of said valve elements to close said exhaust outlet, further movement of said shaft causing said valve seat head to move said one valve element to open communication between said fluid pressure outlet and one of said fluid pressure inlets, abutment means positioned on said shaft for contact with at least one additional valve element in response to further movement of said shaft in said one direction, and a spring carried by said shaft and urging said head yieldingly away from said shaft.

3. The structure of claim 2 characterized by and including a second yielding means urging said shaft and head in a direction opposite said one direction.

4. A hand control valve assembly including a housing, a first and second fluid pressure inlet port in said housing, an outlet port in said housing, an exhaust port in said housing, valve elements in said housing yieldingly urged into position closing communication between said inlet ports and said outlet port and opening communication between said outlet port and said exhaust port, valve operating means movable in one direction in said housing to close communication between said outlet port and said exhaust port and to communicate one of said inlet ports with said outlet port and movable further in said direction to close communication between said one inlet port and said outlet port and open communication between the other of said inlet ports and said outlet port.

5. The structure of claim 4 wherein said operating means includes a shaft slidable in said housing and having an overtravel structure at its inner end, said structure comprising a valve contacting head and a spring urging said head away from said shaft in said direction.

6. A fluid pressure brake system control valve assembly including a housing, a pair of fluid pressure inlet ports in said housing, a fluid pressure outlet port in said housing, an exhaust outlet in said housing, valve means in said housing controlling communication between said ports and valve operating means including a shaft slidable in said housing and having a portion extending therefrom, means on said shaft in said housing and closing said exhaust outlet in response to movement of said shaft in a first direction and uncovering said exhaust outlet for communication with said pressure outlet in response to movement of said shaft in a second direction, said means being positioned to open communication between said first inlet and said pressure outlet in response to further movement of said shaft in said first direction, and means on said shaft positioned to close communication between said first inlet and said pressure outlet and open communication between said second inlet and said pressure outlet in response to still further movement of said shaft in said first direction.

7. The structure of claim 6 characterized by and including among said valve elements, a valve element having a valve face controlling communication between said first inlet and said pressure outlet, a valve shuttle piston yieldingly urged in a first position permitting communication between said first inlet and said pressure outlet and movable in response to said still further movement of said shaft in said first direction into a position closing communication between said first inlet and said pressure outlet and opening communication between said second inlet and said pressure outlet.

8. The structure of claim 6 wherein said first means includes a head carried by and beyond the inner end of said shaft and yielding means urging said head away from said shaft.

9. The structure of claim 8 characterized by and including a second yielding means engaging said housing and said head and shaft to urge said head and shaft in said second direction, said second yielding means having a force level less than that of said first-named yielding means.

* * * * *